United States Patent [19]

Falconer et al.

[11] 4,231,484
[45] Nov. 4, 1980

[54] SAFETY DEVICE FOR PRESSURE VESSELS

[75] Inventors: John D. Falconer, Newcastle upon Tyne; George T. Proudlock, Choppington; Geoffrey Monsen, North Shields, all of England

[73] Assignee: Electrofabrication & Engineering Co. Ltd., England

[21] Appl. No.: 40,039

[22] Filed: May 17, 1979

[51] Int. Cl.³ .............................................. F16K 17/40
[52] U.S. Cl. .................................................. 220/89 A
[58] Field of Search ..................................... 220/89 A

[56] References Cited

U.S. PATENT DOCUMENTS 2,224,748  12/1940  Sauer ................................. 220/89 A
4,079,854  3/1978  Shaw ................................. 220/89 A Primary Examiner—George E. Lowrance

[57] ABSTRACT

A safety device for ensuring relief of excessive pressure in an associated vessel, the device incorporating a reverse buckling disc clamped between inlet and outlet support means, a plurality of knife blades being provided to the outlet side of the device for rupturing the dome portion of the disc on reversal. A deformable ring member is also provided to the outlet side of the device, said ring member being located and dimensioned to dampen or retard the movement of the dome portion during reversal, thereby to prevent the segments of the dome portion formed on rupturing from being torn away from the flange portion of the disc.

10 Claims, 5 Drawing Figures

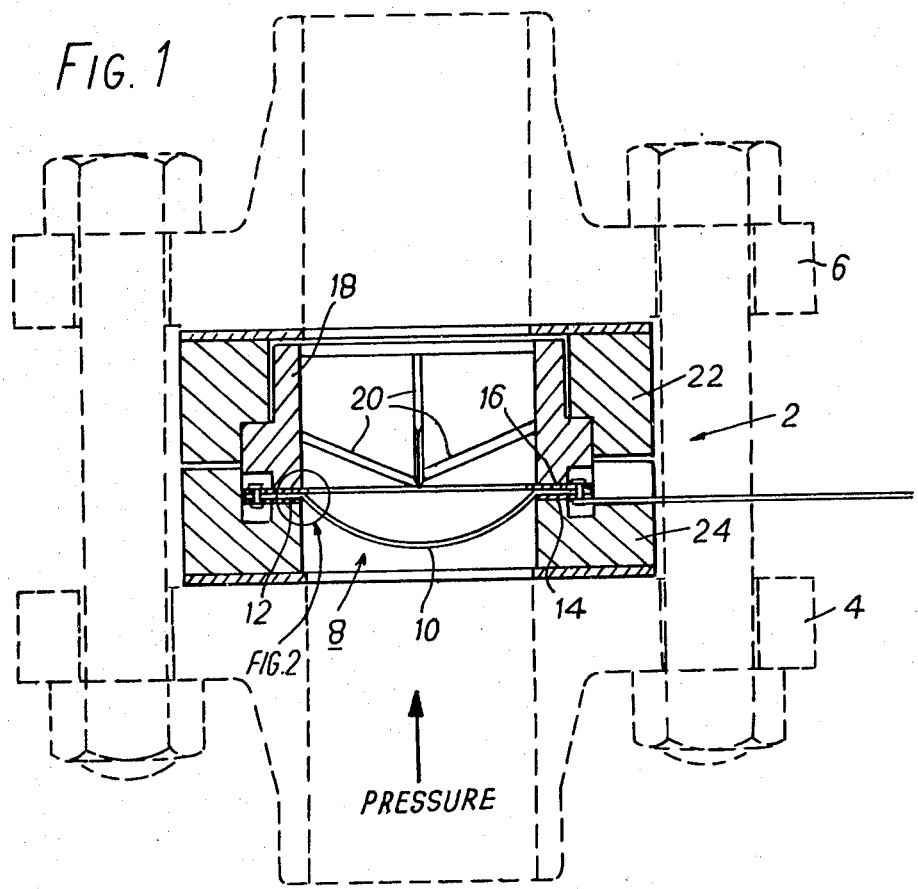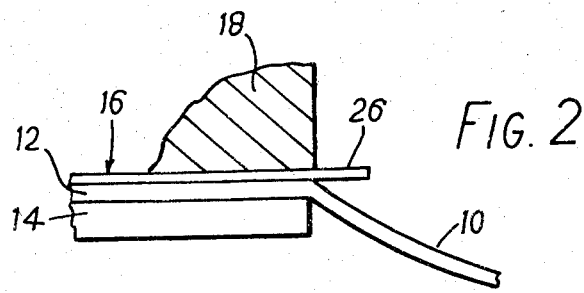

SAFETY DEVICE FOR PRESSURE VESSELS

BACKGROUND OF THE INVENTION

This invention relates to safety devices for pressure vessels, particularly to such devices incorporating reverse buckling discs.

A reverse buckling disc comprises a concave-convex dome portion surrounded by an annular or substantially annular flange portion, and it is established practice to utilise such a disc in conjunction with one or more knife blades to release excessive pressure that may build up inside an associated vessel.

In such an arrangement, the flange portion of the disc is commonly securely clamped between a pair of opposed support means with the convex side of the dome portion facing the pressure vessel, the or each knife blade being located to the concave side of the dome portion of the disc. When a critical pressure is reached in the vessel, the dome portion reverses into contact with the knife blades which rupture and cut the dome portion into segments so that the pressure within the vessel is relieved.

With certain pressure and size combinations, and particularly at high pressures, the segments formed by the knife blades on reversal of discs of the above type have a pronounced tendency to tear along a line defined by the innermost edge of the outlet support means, which line corresponds with the intersection between the dome portion and the flange portion of the disc.

Clearly such tearing can result in loose pieces of metal flying about in the outlet bore and can cause many consequential problems.

It has been proposed to solve this problem by providing the annular outlet member of the disc supporting means with a rounded shoulder which projects radially inwardly of the bore through the inlet member of said means—i.e. radially inwardly of the bore to be monitored. With such an arrangement, and on reversal of the dome portion of the disc, the presence of said shoulder prevents the undesired tearing of the segments formed by the knife blades.

SUMMARY OF THE INVENTION

It is an object of the present invention to provide an improved safety device in which the segments of the dome portion formed on reversal are prevented from tearing away from the flange portion of the disc.

It is a further object of the present invention to provide a safety device of the above type the construction of which is such as to facilitate manufacture of an accurately-dimensioned disc.

It is a still further object of the present invention to provide a safety device of the above type which has improved handleability.

Towards the fulfillment of these and other objects, the safety device of the present invention comprises a reverse buckling disc including a concave-convex dome portion and an annular or substantially annular flange portion surrounding said dome portion, annular inlet and outlet support means between which the flange portion of the disc is clamped with the convex side of the dome portion to be subjected to pressure within the vessel, the outlet support means including a ring member having an inner, deformable, annular portion the internal diameter of which is less than the internal diameter of the flange portion of the disc whereby said deformable portion overlies the radially outer regions of the dome portion of the disc, said annular portion of the ring member being so located that, during reversal of the dome portion of the disc, the movement of the reversing radially outer regions of said disc is retarded by said annular portion of the ring member, which portion of the ring member is itself displaced by the dome portion from a rest position to a deformed position.

The deformable annular portion of the ring member acts as a buffer to the dome portion of the disc during reversal thereof thereby retarding the movement of the disc portion and preventing tearing of the reversed dome portion from the clamped flange portion.

Preferably the outlet support means includes an outlet support member, the ring member being located between said outlet support member and the flange portion of the disc. Conveniently said ring member is secured, for example by spot-welding or rivetting, to the flange portion of the disc.

Alternatively the outlet support means may include an outlet support member and an outlet support ring located between said support member and the flange portion of the disc, the ring member being located between the outlet support ring and the flange portion of the disc or between the outlet support member and the outlet support ring. In both cases it is preferred that the ring member and outlet support ring are secured together and to the flange portion of the disc, for example by spot-welding or rivetting.

In all embodiments of the invention it is preferred that the inlet support means includes an inlet support ring secured, for example by spot-welding or rivetting, to the flange portion of the disc, the internal diameters of the inlet means, the flange portion of the disc and the assembled outlet means, other than the ring member, being identical.

Conveniently the outlet support member includes a plurality of knife blades for rupturing the dome portion of the disc on reversal, in which case the outlet support means may further include a holder member for locating the outlet support member in position within the device.

The ring member may be made of the same material as the reverse buckling disc, the thickness of said ring member being chosen dependent upon the thickness of the disc and the pressure to be monitored. In most applications of the invention, such a ring member will be of a thickness typically ¼ to equal that of the disc.

In an alternative arrangement, the ring member may be made of a material different from that of the disc and conveniently softer than the material of the disc. In such a case the thickness of the ring member will again be chosen to suit particular requirements and may be greater than that of the disc.

BRIEF DESCRIPTION OF THE DRAWINGS

FIG. 1 is a vertical section through a safety device according to the invention clamped between a pair of pipe flanges;

FIG. 2 shows in detail part of the safety device of FIG. 1;

DESCRIPTION OF THE PREFERRED EMBODIMENTS

Figure 3:
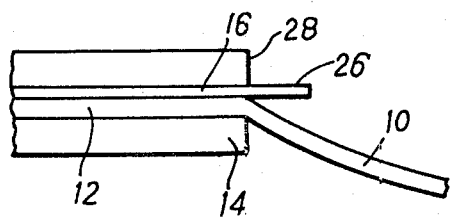
FIGS. 3 and 4 show alternative arrangements for the part of the safety device shown in FIG. 2.

Referring to FIG. 1, the safety device is indicated generally at 2 and is clamped in position between inlet and outlet pipe flanges 4,6 respectively, the pipe flange 4 being secured to a vessel (not shown) the pressure in which is applied to the device.

The device 2 comprises a stainless steel reverse buckling disc indicated generally at 8 and including a concave-convex dome portion 10 surrounded by an annular flange portion 12, the convex side of the dome portion 10 being subjected to the pressure in the vessel. An inlet support ring 14 is rivetted or spot-welded to the inlet side of the flange 12, the internal diameter of said ring 14 being identical with the internal diameter of the flange 12.

The device 2 further comprises a stainless steel ring member 16 rivetted or spot-welded to the outlet side of the flange 12, the internal diameter of said ring member 16 being less than that of the flange 12 and ring 14 and the thickness of said ring member 16, in the embodiment illustrated in FIGS. 1 and 2, being less than that of the material of the disc 8. Said ring member 16 forms part of the outlet support means for the disc 8, said outlet support means further including a support member which comprises a knife blade ring 18 the internal diameter of which is identical with that of the flange 12, said ring 18 carrying three equispaced knife blades 20, and an outlet holder member 22 for locating the ring 18 in position within the device.

Inlet support means for the disc comprise, along with the support ring 14, an inlet holder 24 the internal diameter of which matches that of said ring 14.

Thus the disc 8 along with the inlet support ring 14 and ring member 16 secured thereto comprise a unit which, on assembly of the device, is located on the inlet holder member 24.

The provision of such an integral unit has a number of advantages in that it not only facilitates location of the disc in the assembly but it also facilitates manufacture of an accurately-dimensioned disc (the dome portion is hydraulically blown through the previously attached inlet support ring), and improves the handleability of the disc. Once this unit has been so located, the ring 18 and knife blades 20 carried thereby are positioned in the device which is then completed by the outlet holder member 22.

In the assembled device, the leading edge of the knife blade unit is substantially in the plane passing through the mating faces of the flange 12 and ring member 16, while the ring member 16 includes a flat annular portion 26 which overlies the radially outer regions of the dome portion 10 of the disc 8 as clearly seen in FIG. 2.

When the pressure in the associated vessel reaches the critical value, the dome portion 10 of the disc 8 reverses and is instantly ruptured and cut into three equal segments by the knife blades 20. More particularly, during reversal, the fast-moving dome portion 10 contacts the portion 26 of the ring member 16 over a region approximately level with the interface between the ring member 16 and the flange portion 12 of the disc. The energy of the reversing dome portion 10, in combination with the energy released by the overpressurised system, forces the dome portion 10 against the knife blades 20 with the result that said dome portion is cut. The three segments of the cut dome portion pass completely between the associated knife blades, hinging about the axis X (FIG. 5) formed by the internal edge of the ring 18. During this reversal, the overlying portion 26 of the ring member 16 absorbs energy from the moving dome portion 10 and retards said movement of the dome portion, said overlying portion 26 at the same time being deformed into the radiussed shape shown in FIG. 5. The inherent properties of the overlying portion of the ring member 16—in particular the thickness and strength of the material of said portion 26 in relation to the thickness and material of the disc 8 and the reversal pressure of the vessel—can be chosen such as to eliminate completely tearing of the segments of the dome portion 10 along their intersection with the flange 12 as would otherwise occur.

Figure 5:
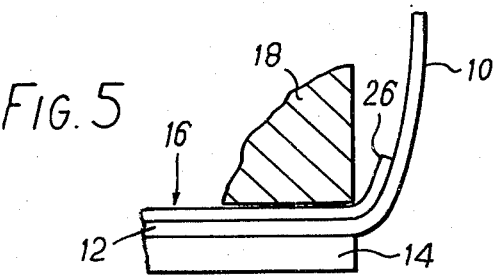
FIG. 5 shows the part of the safety device of FIG. 2 with the disc having undergone reversal.

FIGS. 2 and 5 illustrate a safety device adapted to seat in a 3½ inch bore, the associated vessel having a critical reversal pressure of 370 p.s.i.. The disc 8 is of stainless steel 0.015 inches thick, while the ring member 16 is also of stainless steel but of thickness 0.010 inches and has an internal diameter of 3¼ inches, thus providing an overlying portion 26⅛ inch wide.

FIG. 3 illustrates an arrangement in which the outlet means further comprise an outlet support ring 28, said ring 28 together with the disc 8, ring member 16 and inlet support ring 14 comprising an integral construction.

With a device incorporating the arrangement of FIG. 3 located in its operative position, the knife blade ring 18 thereof abuts the outlet support ring 28.

Figure 4:
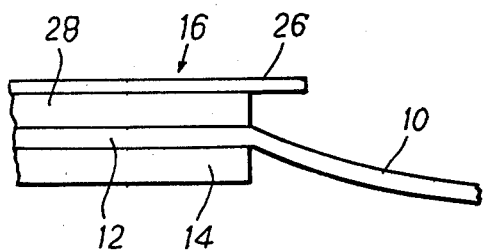

In the arrangement of FIG. 4, and outlet support ring 28 is again provided but said ring is located between the flange portion 12 of the disc 8 and the ring member 16. Again the components 8,14,16 and 28 comprise a unitary construction. It will be appreciated that the ring member 16 of FIG. 4 is axially displaced from the plane of the outlet side of the flange portion 12 of the disc 8, but the effect of the overlying portion 26 of said member 16 on the reversing dome portion 10 can readily be arranged to be the same as that of the portions 26 shown in FIGS. 1,2,3 and 5.

Thus, selection of the correct combination of design parameters of the disc 8 and ring member 16 for a given application of a device according to the invention results in a reverse buckling disc with accurate pressure response and provides a system which, after reversal of the dome portion 10, has maximum flow potential and no loose dome portion pieces therein.

Although the illustrated, exemplary arrangements all show devices incorporating one or more support rings 14,28 with the disc 8, ring member 16 and the or each support ring 14,28 secured together, it is to be emphasised that the invention includes within its scope a safety device incorporating no support rings as such and in which the ring member is separate from the disc—such a device could include an inlet member 24, a disc 10, a ring member 16 separate from the disc 10, and an outlet member housing fixed knife blades, the ring member 16 being clamped between the outlet member and the flange of the disc.

What we claim and desire to secure by Letters Patent is:

1. A safety device for a pressure vessel, said device comprising a reverse buckling disc including a concave-convex dome portion and an annular or substantially annular flange portion surrounding said dome portion, annular inlet and outlet support means defining an internal passageway for communication with said pressure vessel, the flange portion of the disc being clamped between said inlet and outlet support means with the convex side of the dome portion of the disc freely disposed in said passageway to be subjected to pressure within the vessel, the outlet support means including a substantially flat ring member having an inner, deformable, annular portion, the internal diameter of which is less than the internal diameter of the flange portion of the disc, said deformable portion being located to have a normal rest position in which it overlies, but is out of contact with the radially outer regions of the dome portion of the disc, and upon reversal of the dome portion of the disc, initially to be engaged by the reversing radially outer regions of the dome portion of said disc and thereafter itself to be displaced by the dome portion from the normal rest position to a deformed position whereby the movement of said radially outer regions of said dome portion is retarded.

2. A safety device as claimed in claim 1 in which the outlet support means includes an outlet support member, the ring member being located between said outlet support member and the flange portion of the disc.

3. A safety device as claimed in claim 2 in which the ring member is secured to the flange portion of the disc.

4. A safety device as claimed in claim 1 in which the outlet support means includes an outlet support member and an outlet support ring located between said support member and the flange portion of the disc, the ring member being located between the outlet support ring and the flange portion of the disc.

5. A safety device as claimed in claim 4 in which the ring member and the outlet support ring are secured together and to the flange portion of the disc.

6. A safety device as claimed in claim 1 in which the outlet support means includes an outlet support member and an outlet support ring located between said support member and the flange portion of the disc, the ring member being located between the outlet support member and the outlet support ring.

7. A safety device as claimed in claim 6 in which the ring member and the outlet support ring are secured together and to the flange portion of the disc.

8. A safety device as claimed in claim 2 in which the outlet support member includes a plurality of knife blades for rupturing the dome portion of the disc on reversal.

9. A safety device as claimed in claim 8 in which the outlet support means further includes an annular holder member for locating the outlet support member in position within the device.

10. A safety device as claimed in claim 1 in which the inlet support means includes an inlet support ring secured to the flange portion of the disc, the internal diameters of the inlet means, the flange portion of the disc and the assembled outlet means, other than the ring member, being identical.

* * * * *